United States Patent
Seo et al.

(10) Patent No.: US 6,732,360 B1
(45) Date of Patent: May 4, 2004

(54) SYSTEM AND METHOD FOR PROVIDING CONNECTION BETWEEN CLIENT AND HETEROGENEOUS DATABASE MANAGEMENT SYSTEMS

(75) Inventors: Jung-Min Seo, Seoul (KR); Ju-Won Song, Seoul (KR); Eun-Sook Jin, Seoul (KR); Su-Young Yoon, Seoul (KR); Moon-Haeng Huh, Seoul (KR)

(73) Assignee: Korea Telecom, Sungnam-shi (KR)

( * ) Notice: Subject to any disclaimer, the term of this patent is extended or adjusted under 35 U.S.C. 154(b) by 0 days.

(21) Appl. No.: 09/455,931

(22) Filed: Dec. 7, 1999

(30) Foreign Application Priority Data

Dec. 7, 1998 (KR) ......................... 1998-53364

(51) Int. Cl.[7] .................... G06F 15/163; G06F 9/00; G06F 9/54
(52) U.S. Cl. ........................ 719/310; 719/316
(58) Field of Search .............. 709/310–332; 707/1, 2, 10; 719/310, 316

(56) References Cited

U.S. PATENT DOCUMENTS

| | | | | |
|---|---|---|---|---|
| 5,634,053 A | * | 5/1997 | Noble et al. ................... 707/4 |
| 5,710,918 A | * | 1/1998 | Lagarde et al. ............... 707/10 |
| 5,721,904 A | * | 2/1998 | Ito et al. ......................... 707/8 |
| 5,838,965 A | * | 11/1998 | Kavanagh et al. ...... 707/103 R |
| 5,943,671 A | * | 8/1999 | Kleewein et al. ............... 707/9 |
| 6,092,063 A | * | 7/2000 | Cheng et al. ................... 707/2 |
| 6,236,997 B1 | * | 5/2001 | Bodamer et al. ............. 707/10 |

OTHER PUBLICATIONS

Burton et al., Applications of Java programming language to database management, 1997, Department of Computer Science—University of Kentucky.*

Novell Inc., Database Manager for NetWare, Jan. 1998, Novell Research, pp. 63–73.*

* cited by examiner

Primary Examiner—Meng-Al T. An
Assistant Examiner—Diem Cao
(74) Attorney, Agent, or Firm—Staas & Halsey LLP (57) ABSTRACT

A method for providing a connection between a client and heterogeneous database management systems, includes the steps of: a) generating a thread in response to a request message transmitted from the client; b) determining what is the request message and operating a database driver to process the request message by referring to a client information management table; and c) registering identification information of a client and a database in the client information management table and transmitting an execution result corresponding to the request message from the database driver to the client.

10 Claims, 8 Drawing Sheets

SYSTEM AND METHOD FOR PROVIDING CONNECTION BETWEEN CLIENT AND HETEROGENEOUS DATABASE MANAGEMENT SYSTEMS

FIELD OF THE INVENTION

The present invention relates to a system and method for providing a connection between a client and database management systems; and, more particularly, to a system and method for providing a connection between a client and heterogeneous database management systems so that the client simultaneously accesses the heterogeneous database management systems.

DESCRIPTION OF THE PRIOR ART

Recently, many Java developers have desired to develop a Java application for a specific database management system by using a Java language. Further, Javasoft, Inc. defined a general database access framework having Java database connectivity (JDBC). In order to interface a client with a database management system by using the JDBC, a JDBC driver is needed in the Java application. The JDBC driver includes a JDBC-open database connectivity (ODBC) bridge driver, a native-application programming interface (API) partly-Java driver, a net-protocol all-Java driver and a native-API all-Java driver.

The JDBC-ODBC bridge driver provides the JDBC by using an ODBC API. The JDBC-ODBC bridge driver is connected to the client. The client needs the client API binary code of the database management system.

The native-application programming interface (API) partly-Java driver converts a JDBC broker call into a client API of the database management system. Accordingly, the client needs the client API binary code of the database management system.

The native-API all-Java driver converts the JDBC broker call into an independent network protocol capable of interworking with the database management system. However, there is a problem that the native-API all-Java driver is supplied by only specific database management system vendor.

The net-protocol all-Java driver employs a standardized network protocol regardless of a specific database management system. Since the net-protocol all-Java driver employs the standardized network protocol capable of interworking with the database management system, a task of the client may be reduced.

Further, in order to provide a connection accessible to heterogeneous database management systems, a multi-tier net-protocol all-Java driver based on the net-protocol all-Java driver has been suggested. However, there is a problem that the suggested multi-tier net-protocol all-Java driver needs many process resources.

SUMMARY OF THE INVENTION

It is, therefore, an object of the present invention to provide a system and method for providing a connection between a client and heterogeneous database management systems by using a JDBC broker so that the client simultaneously accesses the heterogeneous database management systems.

It is, therefore, another object of the present invention to provide a system and method for providing a connection between a client and heterogeneous database management systems by using a JDBC broker that is capable of saving process resources.

It is further another object of the present invention to provide a computer-readable medium for providing a connection between a client and heterogeneous database management systems by using a JDBC broker so that the client simultaneously accesses the heterogeneous database management systems.

In accordance with an aspect of the present invention, there is provided a system for providing a connection between a client and heterogeneous database management systems, comprising: a communication management means for communicating with the client, wherein said communication management means receives a request message from the client; a thread generation means for generating a thread in response to the request message; a request processing means responsive to the request message and the generated thread for generating a client entry in a client information management table and transmitting identification information of a database and a client together with the request message; and a driver management means responsive to the request message and the identification information of the database and the client for operating a database driver corresponding to the identification information of the database by referring to the client information management table; transmitting the request message to the database driver; registering the database driver and the identification information of the database and the client in the client information management table; and transmitting an execution result corresponding to the request message from the database driver to said communication management means, wherein the database driver calls a request processing function in response to the request message and transmits a query statement to a database management system and transmits the execution result corresponding to the request message to said driver management means.

In accordance with another aspect of the present invention, there is provided a method for providing a connection between a client and heterogeneous database management systems, comprising the steps of: a) generating a thread in response to a request message transmitted from the client; b) determining what is the request message and operating a database driver to process the request message by referring to a client information management table; and c) registering identification information of a client and a database in the client information management table and transmitting an execution result corresponding to the request message from the database driver to the client.

In accordance with further another aspect of the present invention, there is provided a computer-readable medium for providing a connection between a client and heterogeneous database management systems, comprising the steps of: a) generating a thread in response to a request message transmitted from the client; b) determining what is the request message and operating a database driver to process the request message by referring to a client information management table; and c) registering identification information of a client and a database in the client information management table and transmitting an execution result corresponding to the request message from the database driver to the client.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

Figure 1:
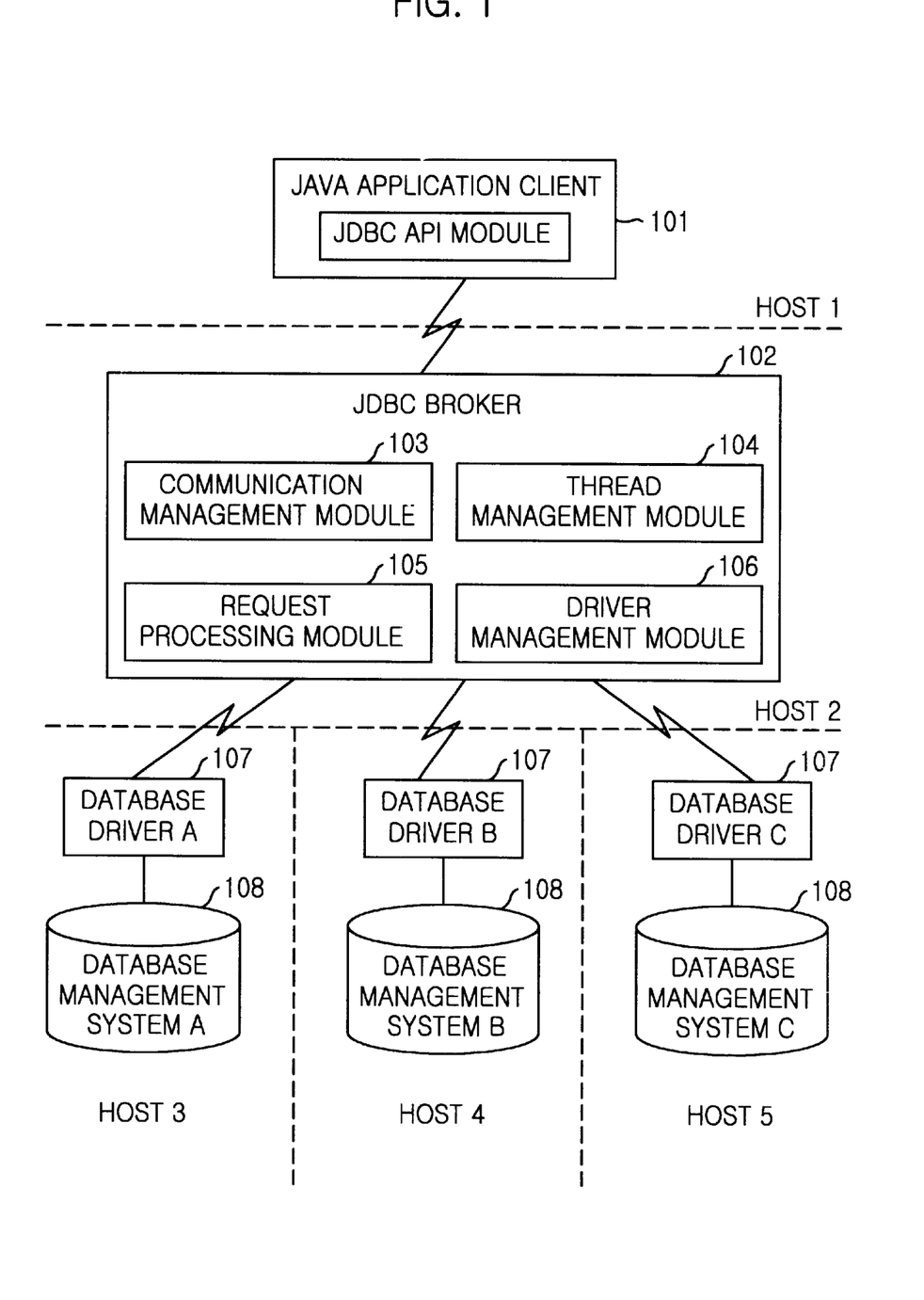
FIG. 1 is a block diagram illustrating a system for providing a connection between a Java application client and database management systems by using a JDBC broker in accordance with the present invention.

Referring to FIG. 1, there is shown a system for providing a connection between a Java application client and database management systems by using a JDBC broker. The system includes a JDBC broker 102 and database drivers 107. A Java application client 101 is a computer system having a JDBC application programming interface (API) module.

The Java application client 101 calls the JDBC API module to access database management systems 108. The JDBC broker 102 as a daemon process manages the connection between the Java application client 101 and the database drivers 107. The Java application client 101 transmits a request message to the JDBC broker 102. The JDBC broker 102 searches a database driver 107, which can process the request message, and connects the Java application client 101 to the database driver 107. Then, information related to the Java application client 101 is stored in a client information management table (not shown), wherein the client information management table is contained in the JDBC broker 102.

The database driver 107 transmits the request message to a database management system 108 in compliance with a network protocol, wherein the network protocol is provided by a database management system 108.

The JDBC broker 102 includes a communication management module 103, a thread management module 104, a request processing module 105 and a driver management module 106. The communication management module 103 manages the connection or connection release between the Java application client 101 and the JDBC broker 102. The communication management module 103 is based on a transmission control protocol (TCP) and an internet protocol (IP). The communication management module 103 performs the communication between the Java application client 101 and the JDBC broker 102 via a socket.

The Java application client 101 transmits the request message to the JDBC broker 102 via the socket. The socket is maintained while the Java application client 101 is connected to the JDBC broker 102.

The communication management module 103 checks all sockets to determine whether the Java application client 101 has transmitted the request message. If the communication management module 103 has received the request message from the Java application client 101, the communication management module 103 transmits the request message to the thread management module 104. When the request message is a connection release request message, the thread management module 104 transmits the connection release request message to the database driver 107. Then, the database driver 107 releases the connection between the JDBC broker 102 and the database management system 108. Further, the communication management module 103 releases resources assigned to the Java application client 101.

The thread management module 104 generates a thread in response to the request message from the Java application client 101. The thread management module 104 transmits the generated thread to the request processing module 105.

The request processing module 105 checks what is the request message. The request processing module 105 transmits the request message to the driver management module 106.

The driver management module 106 transmits the request message to the database driver 107 and receives a response message corresponding to the request message from the database driver 107. The driver management module 106 checks whether the database driver 107 and the JDBC broker 102 are connected with each other. At this time, if an error occurs, the driver management module 106 transmits a commit or abort request to the database driver 107 so that a task performed up to now is reflected to the database management system 108. The driver management module 106 manages database drivers 107. The database drivers 107 exist in an idle or active state. In the active state, the database drivers 107 are connected to the Java application client 101.

Accordingly, the JDBC broker 102 easily integrates a new database management system by simply adding a new database driver. Further, one JDBC application client can access heterogeneous database management systems.

Figure 2:
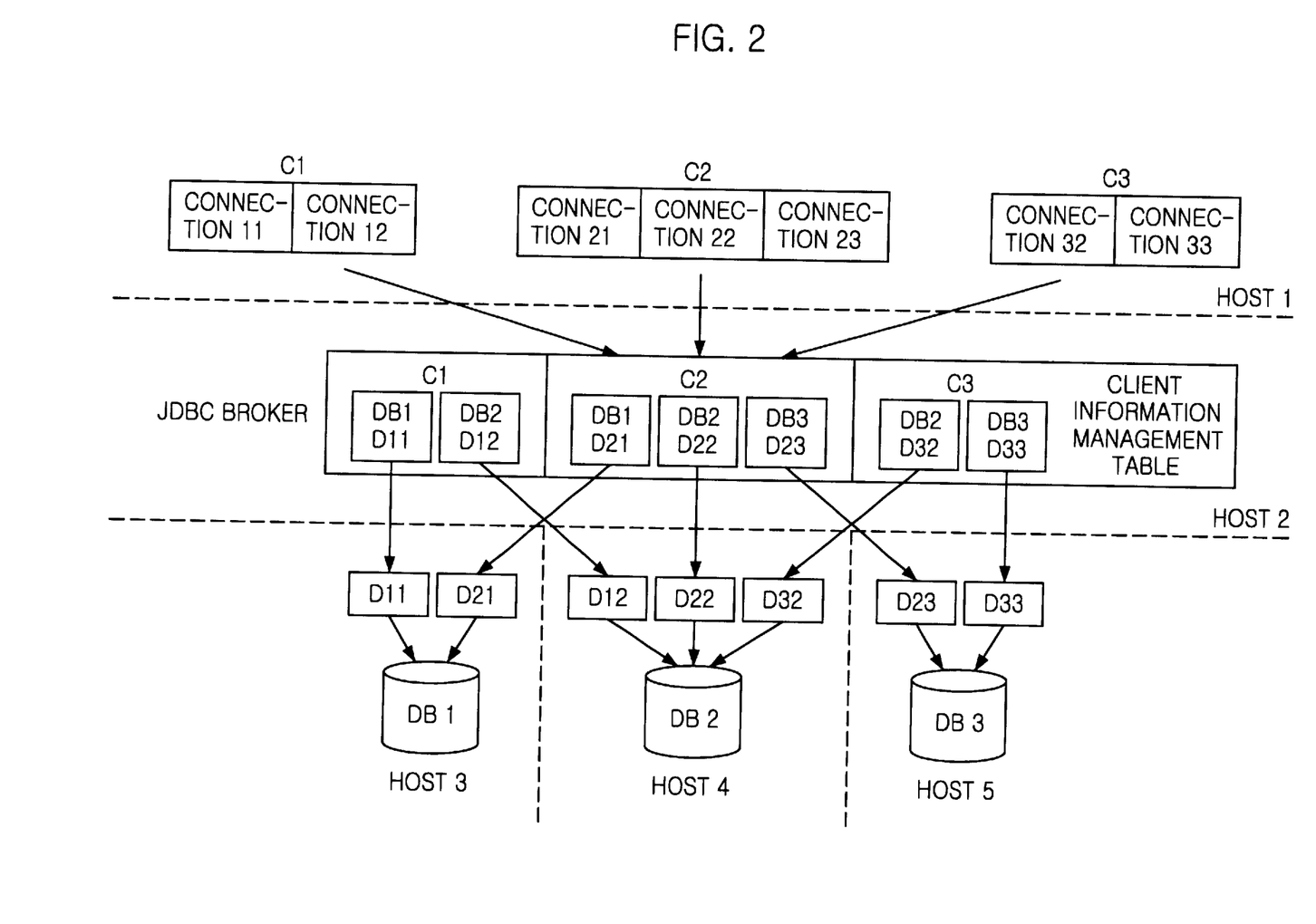
FIG. 2 is an explanatory diagram illustrative of connecting a Java application client to heterogeneous database management systems.

Referring to FIG. 2, there is shown an explanatory diagram illustrative of connecting a Java application client with heterogeneous database management systems. As shown, a Java application client C1 simultaneously accesses database management systems DB1 and DB2. Further, a Java application client C2 simultaneously accesses database management systems DB1, DB2 and DB3. Furthermore, a Java application client C3 simultaneously accesses the database management systems DB2 and DB3.

Where the Java application client C1 simultaneously accesses the database management systems DB1 and DB2, the Java application client C1 transmits a connection request message for the database management systems DB1 and DB2 to the JDBC broker 102. The JDBC broker 102 assigns the connection request message to database drivers D11 and D12. The Java application client C1 is registered in the client information management table. Further, information related to the database drivers D11 and D12 is stored in the client information management table.

Further, where the Java application client C2 simultaneously accesses the database management systems DB1, DB2 and DB3, the Java application client C2 transmits a connection request message for the database management systems DB1, DB2 and DB3 to the JDBC broker 102. The JDBC broker 102 assigns the connection request message to database drivers D21, D22 and D23. The Java application client C2 is registered in the client information management table. Further, information related to the database drivers D21, D22 and D23 is stored in the client information management table.

Furthermore, where the Java application client C3 simultaneously accesses the database management systems DB2 and DB3, the Java application client C3 transmits a connection request message for the database management systems DB2 and DB3 to the JDBC broker 102. The JDBC broker 102 assigns the connection request message to database drivers D32 and D33. The Java application client C3 is registered in the client information management table. Further, information related to the database drivers D32 and D33 is stored in the client information management table.

As described above, the JDBC broker integrates and manages the Java application client and heterogeneous database management systems so that the Java application client is accessible to the heterogeneous database management systems.

Figure 3:
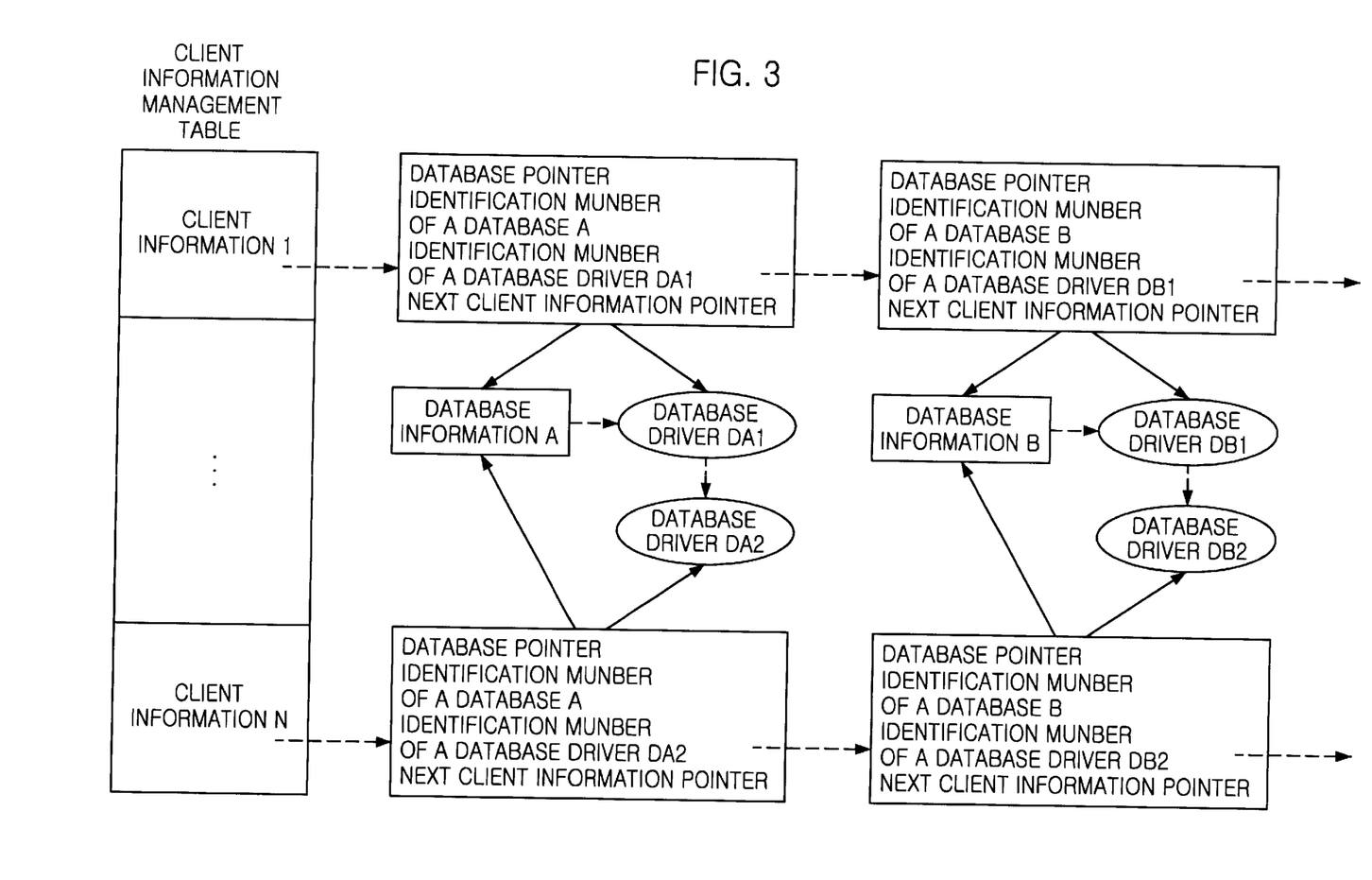
FIG. 3 is an explanatory diagram showing a client information management table.

Referring to FIG. 3, there is shown an explanatory diagram showing a client information management table. The client information management table manages the connection state between a Java application client and a database driver.

As shown, client information includes a database pointer related to a database connected to the Java application client, an identification number of the database currently connected to the Java application client, an identification number of a database driver currently connected to the database and a next client information pointer.

Figure 4A:
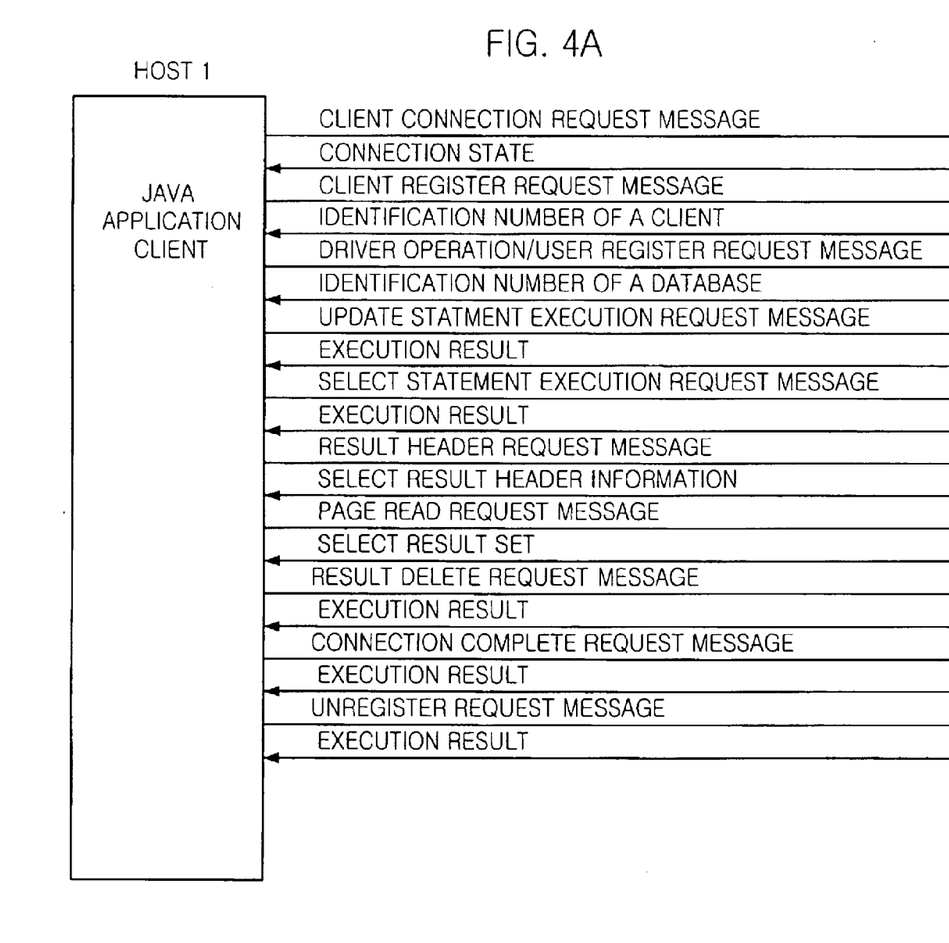
FIGS. 4A and 4B are block diagrams showing interface relationship between a Java application client and a JDBC broker.
Figure 4B:
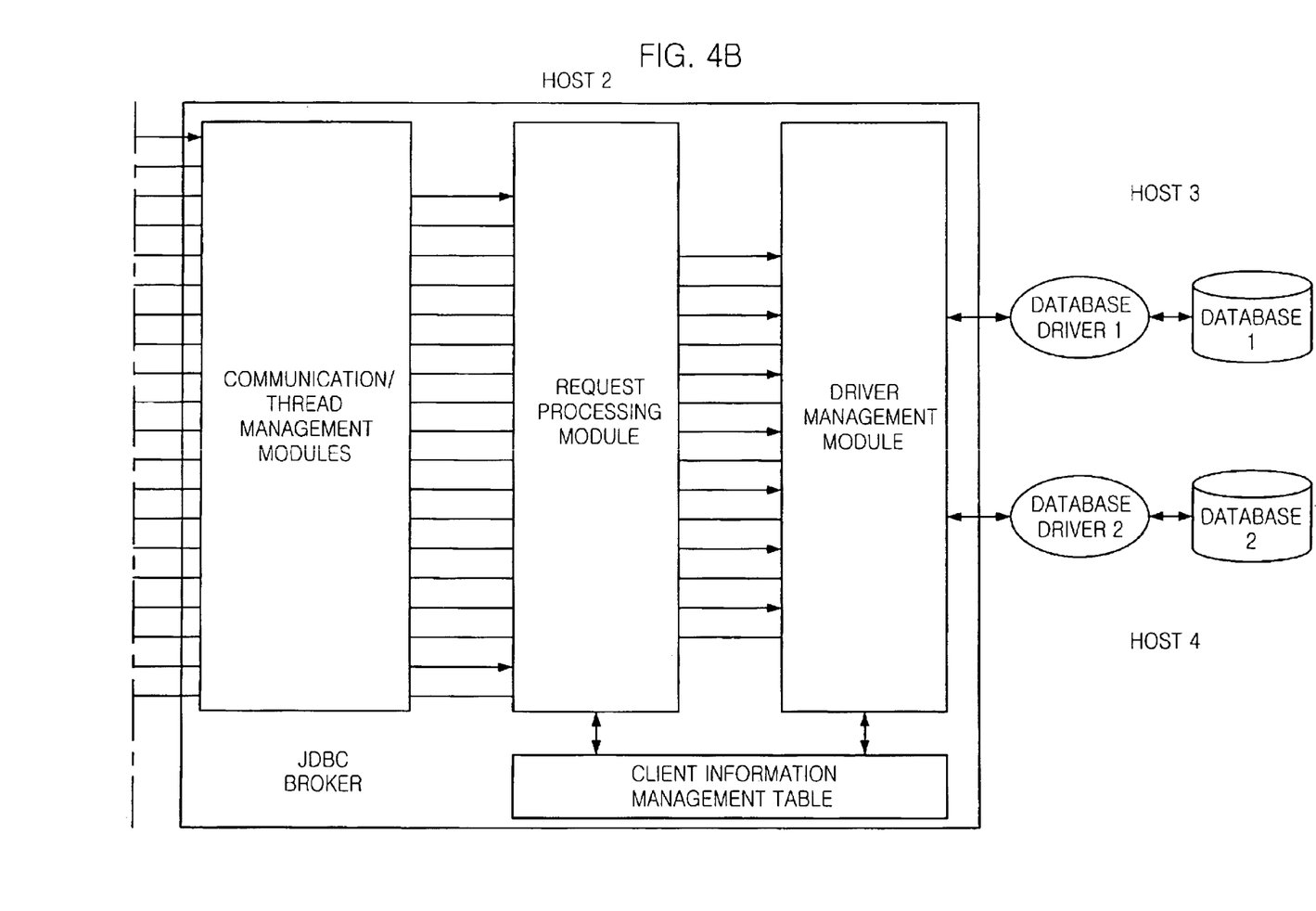

Referring to FIGS. 4A and 4B, there are shown block diagrams showing interface relationship between a Java application client and a JDBC broker. The Java application client transmits a request message to the JDBC broker via the JDBC API module shown in FIG. 1. The request message includes a client connection request message, a client register request message, a driver operation/user register request message, a data definition language, insert, delete and update statement execution request message, a select statement execution request message and a connection complete request message.

Client Connection Request Message

When the JDBC API module transmits the client connection request message to the JDBC broker, the communication management module shown in FIG. 1 transmits communication state information between the Java application client and the JDBC broker to the JDBC API module.

Client Register Request Message

The JDBC API module transmits a database name of a database connected to the Java application client, a user name of the Java application client, a host name of the Java application client, a process name of the Java application client and a maximum timeout interval of the Java application client together with the client register request message to the JDBC broker. Then, the request processing module shown in FIG. 1 assigns the identification number of the Java application client and registers the identification number of the Java application client in the client information management table. The identification number of the Java application client is transmitted to the JDBC API module.

Driver Operation/User Register Request Message

The JDBC API module transmits the identification number of the Java application client, the database name, a user name and a password together with the driver operation/user register request message to the JDBC broker. The request processing module retrieves the identification number of a database by using the database name.

The driver management module operates a database driver related to the database and assigns the identification number of the database driver. The driver management module transmits the user name and the password to a database management system so that a user is registered in the database management system.

The request processing module retrieves information related to a current client in the client information management table. Then, the request processing module writes corresponding information to information items including the database pointer, the identification number of the database and the identification number of the database driver. The request processing module transmits the identification number of the database to the JDBC API module. Where the same Java application client accesses other database, only an additional client register request message is transmitted to the JDBC broker.

Data Definition Language, Insert, Delete and Update Statement Execution Request Message The data definition language, insert, delete and update statements are defined in a JDBC specification. The JDBC API module transmits the identification number of a Java application client, the identification number of a database, the length of a query statement, the query statement, the number of factors and the list of the factors together with an update statement execution request message to the JDBC broker.

The request processing module retrieves the identification number of a database driver in the client information management table by using the identification number of the JDBC application client and the identification number of the database.

The driver management module shown in FIG. 1 transmits information including the length of a query statement, the query statement, the number of factors and the list of the factors to the database driver.

The database driver transmits the information to a database management system. The database management system executes the query statement and transmits an execution result to the JDBC broker via the database driver. The JDBC broker transmits the execution result to the Java application client.

Select Statement Execution Request Message

A select statement is defined in the JDBC specification. The JDBC API module transmits the identification number of a Java application client, the identification number of a database, the length of a query statement, the query statement, the number of factors and the list of the factors together with a select statement execution request message to the JDBC broker.

The request processing module retrieves the identification number of a database driver in the client information management table by using the identification number of the Java application client and the identification number of the database.

The driver management module shown in FIG. 1 transmits information including the length of the query statement, the query statement, the number of the factors and the list of the factors to the database driver.

The database driver transmits the information to a database management system. The database management system executes the query statement. The database driver receives a query identification number from the database management system and transmits the query identification number to the driver management module. When the driver management module retrieves a result set, the query identification number is used. The driver management module stores the query identification number in the client information management table. The query identification number is transmitted to the JDBC API module. The Java application client stores an execution result of the select statement in a result set interface defined in the JDBC specification. Then, the Java application client calls a next string read method and reads tuples of the result set.

When the result set interface is instantiated, the JDBC API module transmits the identification number of the Java application client and the identification number of the database together with a result header request message to the request processing module. The request processing module retrieves the identification number of the database driver and the query identification number in the client information management table. The driver management module transmits the query identification number to the database driver. The database driver transmits result header information corresponding to the query identification number to the JDBC broker. The JDBC broker transmits the result header information to the JDBC API module.

The Java application client receives the result set of the select statement in a page unit. The JDBC API module transmits the identification numbers of the Java application client and the database together with a page read request message. The request processing module retrieves the identification number of a Java application client and the identification number of a database in the client information management table. The driver management module transmits the query identification number to the database driver. The database driver transmits result header information corresponding to the query identification number to the JDBC broker. The JDBC broker transmits the result header information to the JDBC API module.

The Java application client completely reads the result set of the select statement. Then, the Java application client calls a close method of a result set interface to release resources from the database management system and the database driver. The JDBC API module transmits the identification numbers of the Java application client and the database together with a result deletion request message to the JDBC broker. The JDBC broker transmits the query identification number to the database driver such that resources are released. The JDBC broker transmits an execution result to the JDBC API client.

Connection Complete Request Message

The JDBC API module transmits the identification numbers of a Java application client and a database together with the connection complete request message to the JDBC broker. The request processing module retrieves information related to a database driver from the client information management table. The request processing module commits or aborts transaction previously performed. Then, the request processing module deletes database information from the client information management table. The JDBC broker transmits an execution result to the JDBC API client.

Figure 5A:
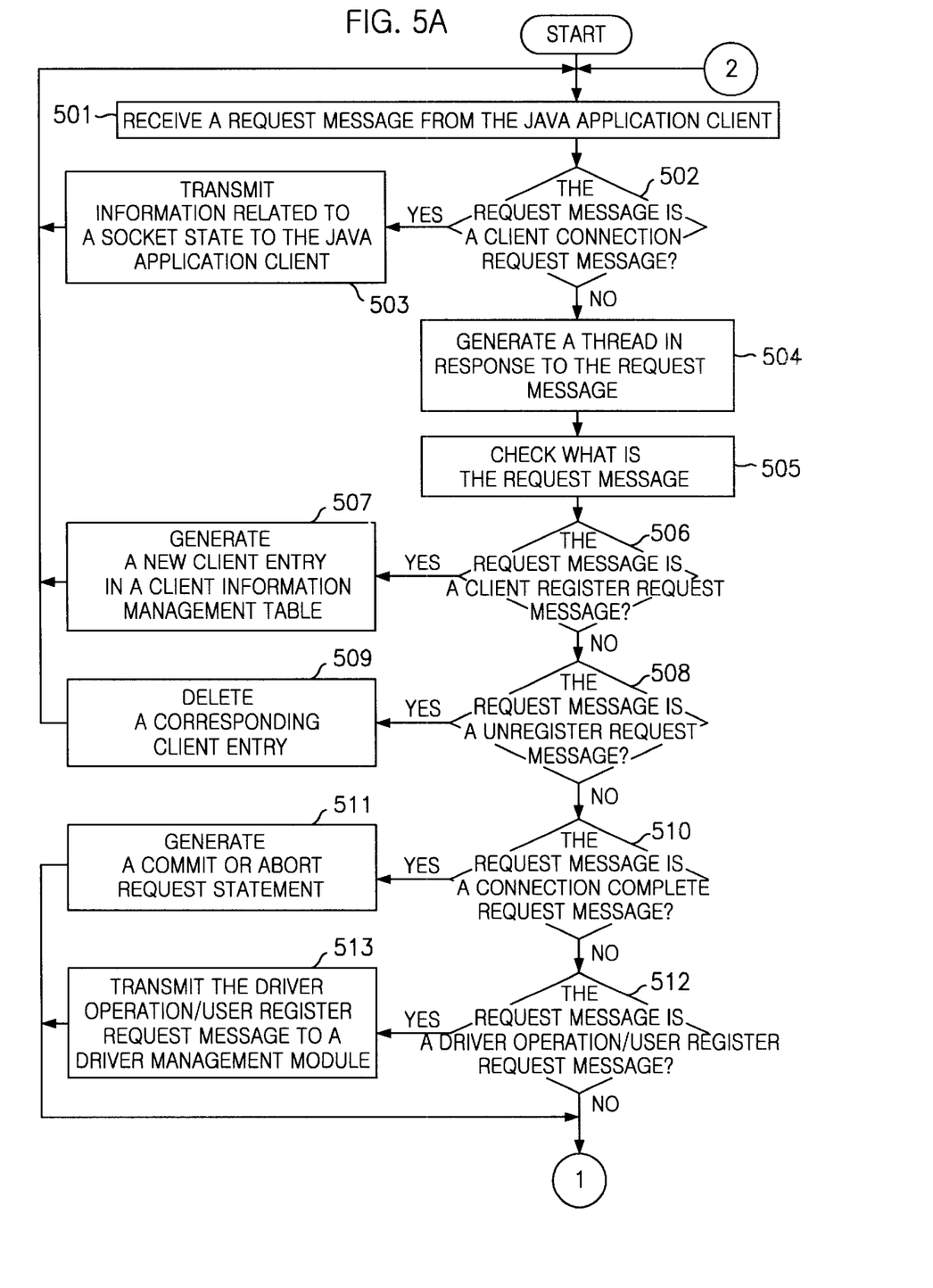
FIGS. 5A to 5C are a flow chart describing a method for providing a connection simultaneously accessible to heterogeneous database management systems by using a JDBC broker in accordance with the present invention.
Figure 5B:
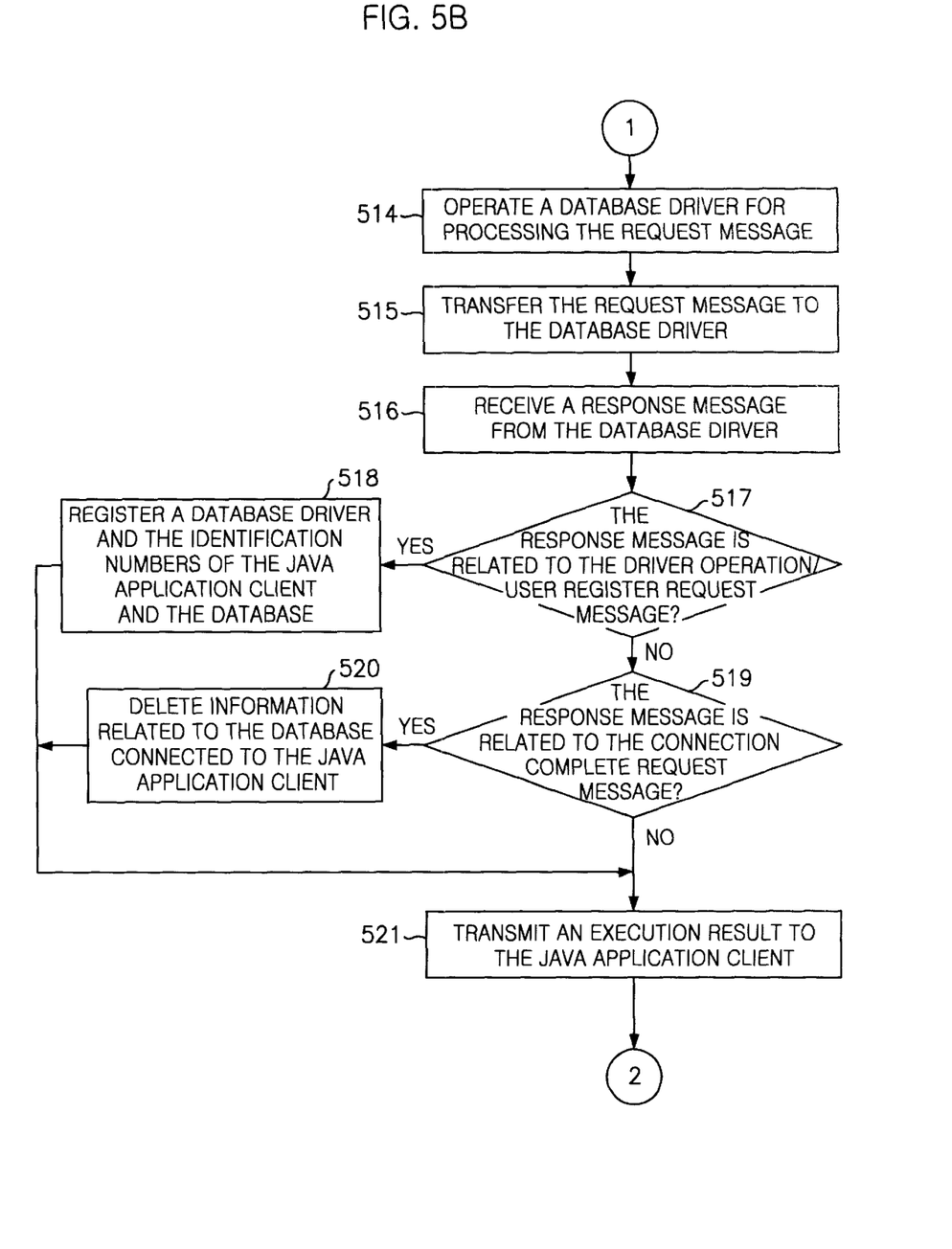
Figure 5C:
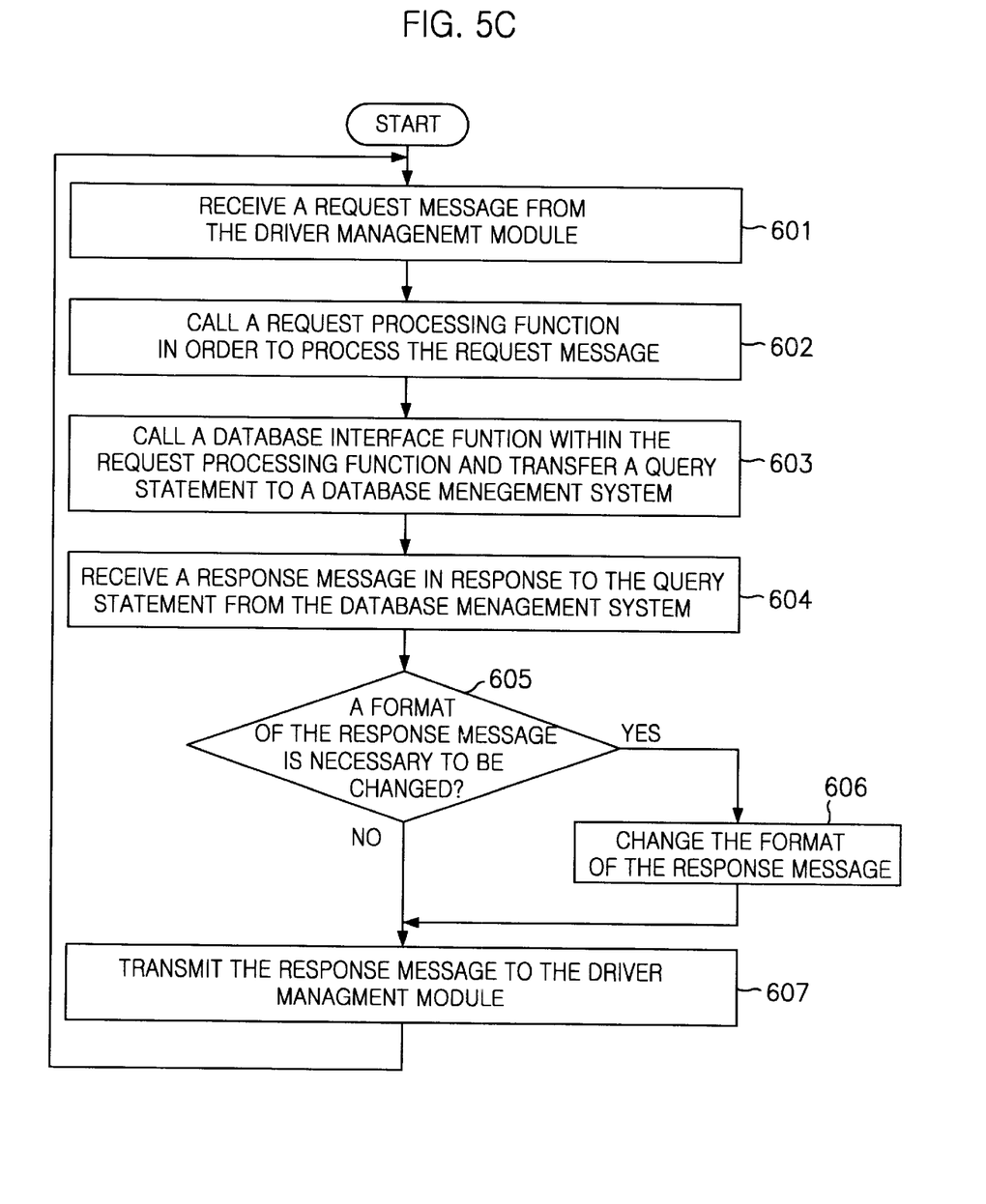

Referring to FIGS. 5A to 5C, there is shown a flow chart describing a method for providing a connection simultaneously accessible to heterogeneous database management systems by using a JDBC broker.

At step 501, the communication management module shown in FIG. 1 receives a request message from the Java application client shown in FIG. 1.

At step 502, the communication management module determines whether the request message is a client connection request message.

At step 503, if the request message is the client connection request message, the communication management module transmits information related to a socket state to the Java application client.

At step 504, if the request message is not the client connection request message, the thread management module generates a thread in response to the request message.

At step 505, the request processing module shown in FIG. 1 checks what is the request message.

At step 506, the request processing module determines whether the request message is a client register request message.

At step 507, if the request message is the client register request message, the request processing module generates a new client entry in a client information management table. Then, the request processing module transmits the identification number of the new client entry to the Java application client.

At step 508, if the request message is not the client register request message, the request processing module determines whether the request message is an unregister request message.

At step 509, if the request message is the unregister request message, the request processing module deletes a corresponding client entry and transmits an execution result information to the Java application client.

At step 510, if the request message is not the request release request message, the request processing module determines whether the request message is a connection complete request message.

At step 511, if the request message is the connection complete request message, the request processing module generates a commit or abort request statement. The request processing module transmits the commit or abort request statement to database driver via the driver management module.

At step 512, if the request message is not the connection complete request message, the request processing module determines whether the request message is a driver operation/user register request message.

At step 513, if the request message is the driver operation/user register request message, the request processing module transmits the driver operation/user register request message to the driver management module.

At step 514, the driver management module shown in FIG. 1 refers to the identification numbers of a Java application client and a database in the client information management table in order to operate a database driver for processing the request message.

At step 515, the driver management module transfers the request message to the database driver.

At step 516, the driver management module receives a response message from the database driver.

At step 517, the driver management module determines whether the response message is related to the driver operation/user register request message.

At step 518, if the response message is related to the user register request message, the driver management module registers a database driver and the identification numbers of the Java application client and the database in the client information management table.

At step 519, if the response message is not related to the driver operation/user register request message, the driver management module determines whether the response message is related to the connection complete request message.

At step 520, if the response message is related to the connection complete request message, the driver management module deletes information related to the database connected to the Java application client in the client information management table.

At step 521, the communication management module transmits result information to the Java application client. The steps 501 to 521 are repeated until all request messages are processed.

Referring to FIG. 5C, there is shown a procedure where the drive management module shown in FIG. 1 receives a response message from a database driver shown in FIG. 1.

At step 601, the database driver receives a request message from the driver management module.

At step 602, the database driver calls a request processing function in order to process the request message.

At step 603, the database driver calls a database interface function within the request processing function and transfers a query statement to a database management system.

At step 604, the database driver receives a response message in response to the query statement from the database management system.

At step 605, the database driver determines whether a format of the response message is necessary to be changed.

At step 606, if the format of the response message is necessary to be changed, the database driver changes the format of the response message.

At step 607, if the format of the response message is not necessary to be changed, the database driver transmits the response message to the driver management module.

As described above, the method for providing a connection accessible to heterogeneous database management systems can be stored in a computer-readable medium, e.g. an optical disk, a hard disk and so on.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method of providing a connection between a client and heterogeneous database management systems, comprising:
   a) generating a thread in response to a request message transmitted from the client;
   b) determining what is the request message and operating a database driver to process the request message by referring to a client information management table; and
   c) registering identification information of a client and a database in the client information management table and transmitting an execution result corresponding to the request message from the database driver to the client, including:
      c1) receiving a response message corresponding to the requesting message from the database driver;
      c2) determining whether the response message is related to the database driver operation request message or the connection complete request message;
      c3) if the response message is related to the database driver operation request message, registering the identification information of the client and the database in the client information management table;
      c4) if the response message is related to the connection complete request message, deleting a database information entry related to the client in the client information management table; and
      c5) transmitting the execution result corresponding the request message from the database driver to the client.

2. The method as recited in claim 1, wherein said step a) includes:
   a1) receiving the request message from the client;
   a2) determining whether the request message is a client connection request message;
   a3) if the request message is the client connection request message, transmitting information related to a socket state to the client; and
   a4) if the request message is not the client connection request message, generating the thread in response to the request message.

3. The method as recited in claim 2, wherein said step b) includes:
   b1) determining what is the request message:
   b2) if the request message is a client register request message, generating a client entry in the client information management table;
   b3) if the request message is an unregister request message, deleting the client entry in the client information management table;
   b4) if the request message is a connection complete request message, generating a commit or abort request statement and transmitting the commit or abort request statement to the database driver; and
   b5) if the request message is a database driver operation request message, operating the database driver to process the request message by referring to the client information management table.

4. The method as recited in claim 1, wherein said step c1) includes:
   c1-a) transmitting the request message to the database driver;
   c1-b) calling a request processing function and a database interface within the request processing function and transmitting a query statement to a database management system;
   c1-c) receiving the response message corresponding to the query statement from the database management system;
   c1-d) determining whether a format of the response message should be changed;
   c1-e) if the format of the response message should be changed, changing the format of the response message; and
   c1-f) receiving the response message in the form of the format changed from the database driver.

5. The method as recited in claim 4, wherein said client information management table includes a database pointer related to the database connected to the client; identification information of the database currently connected to the client; identification information of said database driver currently connected to the database; and a next client information pointer.

6. A computer-readable medium for providing a connection between a client and heterogeneous database management systems, comprising the steps of:
   a) generating a thread in response to a request message transmitted from the client;
   b) determining what is the request message and operating a database driver to process the request message by referring to a client information management table; and
   c) registering identification information of a client and a database in the client information management table and transmitting an execution result corresponding to the request message from the database driver to the client, including:
      c1) receiving a response message corresponding to the requesting message from the database driver;
      c2) determining whether the response message is related to the database driver operation request message or the connection complete request message;

c3) if the response message is related to the database driver operation request message, registering the identification information of the client and the database in the client information management table;

c4) if the response message is related to the connection complete request message, deleting a database information entry related to the client in the client information management table; and c5) transmitting the execution result corresponding the request message from the database driver to the client.

7. The computer-readable medium as recited in claim 6, wherein said step a) includes:

a1) receiving the request message from the client;

a2) determining whether the request message is a client connection request message;

a3) if the request message is the client connection request message, transmitting information related to a socket state to the client; and a4) if the request message is not the client connection request message, generating the thread in response to the request message.

8. The computer-readable medium as recited in claim 7, wherein said step b) includes:

b1) determining what is the request message;

b2) if the request message is a client register request message, generating a client entry in the client information management table;

b3) if the request message is an unregister request message, deleting the client entry in the client information management table;

b4) if the request message is a connection complete request message, generating a commit or abort request statement and transmitting the commit or abort request statement to the database driver; and b5) if the request message is a database driver operation request message, operating the database driver to process the request message by referring to the client information management table.

9. The computer-readable medium as recited in claim 6, wherein said step c1) includes:

c1-a) transmitting the request message to the database driver;

c1-b) calling a request processing function and a database interface within the request processing function and transmitting a query statement to a database management system;

c1-c) receiving the response message corresponding to the query statement from the database management system;

c1-d) determining whether a format of the response message should be changed;

c1-e) if the format of the response message should be changed, changing the format of the response message; and c1-f) receiving the response message in the form of the format changed from the database driver.

10. The computer-readable medium as recited in claim 9, wherein said client information management table includes a database pointer related to the database connected to the client; identification information of the database currently connected to the client; identification information of said database driver currently connected to the database; and a next client information pointer.

* * * * *